United States Patent [19]

Gay

[11] Patent Number: 4,937,365
[45] Date of Patent: Jun. 26, 1990

[54] ALPHA-MERCAPTOESTER SUBSTITUTED DIORGANOPOLYSILOXANES

[75] Inventor: Michel Gay, Lyon, France

[73] Assignee: Rhone-Poulenc Chimie, Courbevoie, France

[21] Appl. No.: 159,914

[22] Filed: Feb. 24, 1988

[30] Foreign Application Priority Data

Feb. 24, 1987 [FR] France ................... 87 02618

[51] Int. Cl.$^5$ ............................................. C07F 7/08
[52] U.S. Cl. ..................................................... 556/429
[58] Field of Search .......................................... 556/429

[56] References Cited

U.S. PATENT DOCUMENTS 3,382,196  5/1968  Gowdy et al. ............... 556/429 X
3,388,144  6/1968  Musolf et al. ............... 556/429 X
3,509,193  4/1970  Niederprüm et al. ............ 556/429
4,046,795  9/1977  Martin ........................ 556/429
4,230,816  10/1980 Martin ...................... 556/429 X
4,251,277  2/1981  Martin ...................... 556/429 X
4,289,867  9/1981  Martin ...................... 556/429 X Primary Examiner—Paul F. Shaver
Attorney, Agent, or Firm—Burns, Doane, Swecker & Mathis

[57] ABSTRACT

Novel alpha-mercaptoester substituted diorganopolysiloxanes, well adapted for the stabilization of vinyl chloride polymers, have the following general formula (1):

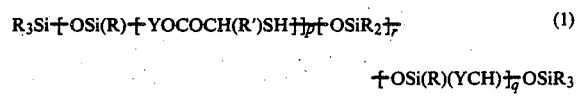

$$\text{+OSi(R)(YCH)}\overline{\tau_q}\text{OSiR}_3$$

10 Claims, No Drawings

ALPHA-MERCAPTOESTER SUBSTITUTED DIORGANOPOLYSILOXANES

BACKGROUND OF THE INVENTION

1. Field of the Invention

The present invention relates to diorganopolysiloxanes containing an alpha-mercaptoester functional group, a process for preparing same and to the use or end applications thereof, particularly as a stabilizer for polymers based on polyvinyl chloride (PVC).

2. Description of the Prior Art

Many diorganopolysiloxanes bearing various organic functional groups are already known to this art, such as, for example, those described on pages 261 to 268 of the text by Noll, *Chemistry and Technology of Silicones*, 1968 English language edition, and in U.S. Pat. Nos. 4,261,875 and 4,294,974.

Furthermore, many stabilizers for PVC-based polymers also exist, and, among these, particularly representative are the glycol diesters of 2-mercaptopropionic acids, described in particular in French Patent No. 2,552,440.

SUMMARY OF THE INVENTION

A major object of the present invention is the provision of other and inexpensive diorganopolysiloxanes containing an alpha-mercaptoester functional group, which are easy to prepare and which offer many and interesting end applications, particularly as a stabilizer for PVC.

Briefly, the present invention features diorganopolysiloxanes of the formula:

$$R_3Si\text{-}[OSi(R)\text{-}[YOCOCH(R')SH]]_p[OSi R_2]_r \quad (1)$$

$$[OSi(R)(YCH)]_q OSiR_3$$

in which:

the symbols R, which are identical or different, are each $C_1$–$C_8$ linear or branched chain alkyl, phenyl or 3,3,3-trifluoropropyl radicals, at least 80% of the radicals R being methyl radicals;

the symbols Y, which are identical or different, are each $C_1$–$C_{18}$ linear or branched chain alkylene radicals, optionally extended, if desired, by a polyether chain member selected from among poly(ethylene oxide), poly(propylene oxide) and mixtures thereof;

the symbol R' denotes a hydrogen atom or a $C_1$–$C_8$ linear or branched chain alkyl radical;

p is an integer from 1 to 50, inclusive, preferably from 1 to 16 inclusive;

q is an integer from 0 to 30, inclusive, preferably from 0 to 8 inclusive;

r is an integer from 0 to 500, inclusive, preferably from 2 to 50 inclusive.

DETAILED DESCRIPTION OF THE PREFERRED EMBODIMENTS OF THE INVENTION

More particularly according to the present invention, when the polymers of formula (1) are in the form of a mixture having the same units but differing in number, as in certain of the examples to follow, this mixture may of course be denoted by an average formula (1) in which p, q and r may be fractional numbers.

Methyl, ethyl, n-propyl, isopropyl, n-butyl and 2-ethylhexyl radicals are exemplary of the R and R' alkyl radicals.

As examples of diorganosiloxane units $R_2SiO$, representative are:

$(CH_3)_2SiO$ $(C_6H_5)(CH_3)SiO$ $(CF_3\text{-}CH_2\text{-}CH_2)(CH_3)SiO$

As examples of the radicals Y, representative are:
—$CH_2$—, —$(CH_2)_2$—, —$(CH_2)_3$—$(OCH_2$—$CH_2)_{29}$—, —$(CH_2)_3$—, —$(CH_2)_3(O$—$CH_2$—$CH(CH_3))_{15}$—, —$CH_2$—$CH(CH_3)CH_2$—, —$(CH_2)_{12}$—.

The radical —$(CH_2)_3$— is the preferred.

As examples of the radicals —OCOCH(R')SH, representative are:

—$OCOCH_2SH$

—$OCOCH(CH_3)SH$

—$OCOCH(CH_2CH_3)SH$

R' is preferably H or methyl, essentially for reasons of availability of raw materials.

The polymers of formula (1) may be block copolymers, depending upon the nature of the starting copolymers employed for the synthesis of the copolymers of formula (1).

The present invention also features a process for preparing the polymers of formula (1), according to which the alpha-mercaptoacid of formula:

$$HOOCCH(R')SH \quad (2)$$

in which R' has the same meaning as in formula (1), is reacted with a diorganopolysiloxane of the formula:

$$R_3Si\text{-}[OSiR_2]_r[OSiR(YOH)]_{p+q}\text{-}OSiR_3 \quad (3)$$

in which R, Y, r, p and q are as defined in formula (1), such as to produce a polymer of formula (1) and water of condensation, which is removed.

The reaction can be carried out in bulk or, preferably, in an organic solvent medium such as xylene and toluene.

The condensation reaction is accelerated by the addition of an acidic catalyst, for example a sulfonic acid such as p-toluenesulfonic acid.

The water formed may be removed by refluxing the reaction mixture and by distilling off the water azeotropically.

When it is desired to produce a polymer of formula (1) in which q=0, then either a substantially stoichiometric quantity of alpha-mercaptoacid of formula (2) is employed or, preferably, a molar excess of this acid, which is removed by phase separation under gravity upon completion of the reaction after neutralization with a basic aqueous solution (for example a solution of sodium acetate).

When it is desired to produce a polymer of formula (1) where q is other than 0, then a modified quantity, which is smaller than the stoichiometric quantity, of alphamercaptoacid of formula (2) is employed, depending on the numbers p and q which are selected beforehand.

In order to prepare the starting materials of formula (3) in the case where these products are novel or are not available commercially, a hydroorganopolysiloxane of the formula:

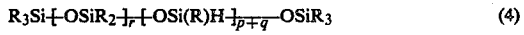
(4)

in which R, r, p and q are as defined in formula (1), in particular, is reacted with an alcohol containing olefinic unsaturation of formula WOH in which W is a linear or branched radical containing from 2 to 18 carbon atoms. Among these alcohols, allyl and methallyl alcohols are more particularly employed with the use of a platinum hydrosilylation catalyst, in accordance with the teaching of U.S. Pat. Nos. 2,970,150 and 4,160,775.

The materials of formula (4) are products which are well known in the silicone industry and are generally available commercially, or can be easily prepared using methods which are the subject of very many publications. Many polymers of formula (4) are described, for example, in U.S. Pat. Nos. 3,220,942, 3,341,111 and 3,436,366.

A more particularly advantageous use of the polymers or products of formula (1) is for stabilizing halogen-containing polymers, and especially polymers based on vinyl chloride. Such application is characterized by the combined use of:

(a) an effective amount of at least one organic zinc derivative;
(b) an effective amount of at least one organic derivative of a metal of Group $II_a$ of the Periodic Table of elements or of at least one hydrotalcite; and
(c) an effective amount of at least one polysiloxane of formula (1).

By organic derivative of zinc, as well as an organic derivative of a metal of Group $II_a$ are intended:

salts in which the anion principally originates from saturated or unsaturated aliphatic monocarboxylic or dicarboxylic acids containing from 2 to 24 carbon atoms, or of $C_1$–$C_{24}$ alkyl or $C_3$–$C_{24}$ alkenyl monoesters of the above substituted or unsubstituted aliphatic dicarboxylic acids, or of substituted or unsubstituted aromatic or alicyclic monocarboxylic acids; among the anions which are most typically employed, representative are those derived from maleic, acetic, propionic, hexanoic, 2-ethylhexanoic, octanoic, decanoic, undecanoic, lauric, myristic, palmitic, stearic, oleic, ricinoleic, behenic, hydroxystearic, hydroxyundecanoic, benzoic, phenylacetic, alkylbenzoic, para-tert-butylbenzoic and salicylic acids;

metal derivatives (phenolates) of substituted or unsubstituted phenolic compounds such as phenol or phenols substituted by an alkyl radical preferably containing from 4 to 24 carbon atoms;

mercaptides, for example isooctyl 2-zinciosulfuroacetate; and chelates of beta-dicarbonyl compounds.

For practical reasons or for economic reasons, the metal derivatives referred to above which are preferred are those derived from carboxylic acids or from phenolic compounds.

The hydrotalcites also employed as compound (b) in the process according to the invention are compounds which have the general formula:

(4)

in which:
a is a number form 0 to 0.5;
A denotes $SO_4^-$ or $CO_3^-$; and
p denotes the number of water molecules per molecule of hydrotalcite.

These hydrotalcites include natural hydrotalcites and the hydrotalcites produced by processing natural hydrotalcites.

These are, in particular, the hydrotalcites described in French Patent No. 2,483,934.

Thus, as compound (a), frequently used are zinc salts of propionic, octanoic, lauric, stearic, oleic, ricinoleic, benzoic, para-tert-butylbenzoic and salicylic acids, or of mono-2-ethylhexyl maleate and zinc nonylphenates; as compounds (b), frequently used are calcium, magnesium, barium or strontium salts of propionic, octanoic, lauric, stearic, oleic, ricinoleic, benzoic, para-tertbutylbenzoic and salicylic acids and of mono-2-ethylhexyl maleate and of calcium, magnesium, barium or strontium nonylphenates; as compound (b), hydrotalcites are also frequently used, and more preferably the commercial hydrotalcites produced by processing natural hydrotalcites.

Among the derivatives noted under (b), those preferred for food-contact applications are the calcium derivatives and the magnesium derivatives and the hydrotalcites and, still more particularly, the calcium derivatives and the hydrotalcites which produce very good results.

The compounds (b) are also widely used in mixtures such as organic Ca and Ba salts, organic Ca and Mg salts, hydrotalcite and organic Ca salt, hydrotalcite and organic Ba salt or hydrotalcite and organic Mg salt.

Proportions from 0.005 to 5% by weight of compounds (b) relative to the polymer to be stabilized and preferably from 0.02 to 2% enable good results to be obtained, together with the other stabilizers.

Proportions from 0.005 to 1% by weight of compound (a) relative to the polymer to be stabilized and preferably from 0.01 to 0.6% produce very good results.

The polysiloxanes of formula (1) are employed in polymer-related proportions which vary very widely according to the content of mercaptoester functional group. These proportions generally range from 0.005% by weight to 5% by weight relative to the polymer. Preferably, from 0.05% by weight to 2% by weight of polysiloxanes of formula (1), relative to the polymer, will be employed.

As a general rule, it may be indicated that the weight proportion of each of the constituents of the compositions according to the invention will be proportionally higher in the polymeric compositions to be stabilized, the more rigid the latter, that is to say, the less plasticizer they contain.

It will be apparent that within the range of the various proportions given for each of the constituents (a), (b) and (c), relative to the polymer, one skilled in this art would adapt the relative relationships of these various constituents, in order to obtain certain formulations or others which are more particularly intended to yield the desired result, or depending on the origin or on the method of preparation of the polymer.

Thus, for example, the polymers prepared in suspension will be capable, in general, of containing a higher proportion of zinc than the polymers prepared in bulk, but these proportions nevertheless remain preferably included within the values indicated previously. Together with the organic zinc derivatives, the organic derivatives of the metals of Group $II_a$ of the Periodic Table and/or with the hydrotalcites and with the polysiloxanes of formula (1), it may be advantageous to employ a polyol in carrying out the process according to the invention, although a compound of this kind is not indispensable. Its presence is particularly advantageous for stabilizing vinyl chloride-based polymers which are prepared in bulk.

The polyols are generally suitable for extending the stabilizing action of the metal or organic compounds employed in the process according to the invention. Nevertheless, a compromise has to be found because these products tend to color the compositions. In the case of problems of the processing of vinyl chloride-based polymers at elevated temperature, it is preferable that the polyols employed in the stabilization process according to the invention have a boiling point above 150° C., and in most cases above 170° C.

By way of specific examples of such polyols, representative are the triols such as trimethylolpropane, glycerol, 1,2,6-hexanetriol, 1,2,4-butanetriol and trishydroxyethyl isocyanurate, tetrols such as pentaerythritol, diglycerol, pentitols such as xylitol, hexitols such as sorbitol, mannitol and dipentaerythritol, polyols containing eight hydroxyl groups such as tripentaerythritol and polymers containing free hydroxyl groups such as polyvinyl alcohols, especially those in which there remains less than 30%, on a molar basis, of ester groups relative to the combination of the hydroxyl and ester groups and which have a viscosity ranging from approximately 4 mPa.s to 60 mPa.s at 25° C. in aqueous solution at a concentration of 4% by weight.

From 0.005% to 1% by weight, and preferably from 0.01% to 0.6%, of polyol are generally employed, relative to the polymer to be stabilized.

It has been found that the polyols containing more than four hydroxyl groups in their molecule give particularly satisfactory results.

Thus, polyols such as sorbitol, mannitol and xylitol are particularly effective in the process according to the invention and this is the case even when they are employed in low dosages. Thus, although these compounds may be employed in dosages which preferably range from 0.01% to 0.25% by weight, relative to the polymer, a marked improvement in the stabilization of the polymeric compositions which contain them results, and no coloration side effect is observed, at concentrations as low as 0.05% to 0.01% by weight relative to the polymer.

To carry out the process of the invention, another object thereof is in the mixture of at least one organic zinc derivative, at least one organic derivative of a metal of Group $II_a$ of the Periodic Table of elements or of at least one hydrotalcite and of at least one polysiloxane of formula (1).

Such mixtures may be prepared in all proportions; in general, the weight proportions of the various constituents are such that there are present:
(i) from 5 to 40% of organic zinc derivative;
(ii) from 5 to 90% of organic derivative of a metal of Group $II_a$ of the Periodic Table of the elements or of hydrotalcite; and
(iii) from 5 to 90% of polysiloxanes of formula (1).

Finally, the invention also features the stabilized polyvinyl chloride-based compositions.

By "polyvinyl chloride-based compositions" are intended compositions containing a vinyl chloride homopolymer, a vinyl chloride copolymer with various other monomers or a mixture of polymers or copolymers in which a predominant fraction is obtained from vinyl chloride.

In general, any type of vinyl chloride homopolymer is suitable, whatever its method of preparation: polymerization in bulk, in suspension, in dispersion or of any other type, and whatever its intrinsic viscosity.

The vinyl chloride homopolymers may be chemically modified such as, for example, chlorinated vinyl chloride polymers.

Many vinyl chloride copolymers may also be stabilized against the effects of heat: yellowing and degradation. They include copolymers obtained by copolymerization of vinyl chloride with other monomers containing a polymerizable ethylenic bond, such as, for example, vinyl esters: vinyl acetate, vinylidene chloride, maleic or fumaric acids (or their esters), the olefins: ethylene, propylene and hexene, acrylic esters, styrene or vinyl ethers: vinyl n-dodecyl ether.

These copolymers usually contain at least 50% by weight of vinyl chloride recurring units. However, the invention applies particularly well to copolymers containing at least 80% by weight of vinyl chloride units.

The invention also applies well to mixtures of polymers containing minor quantities of other polymers such as halogenated polyolefins or acrylonitrile-butadiene-styrene copolymers or to mixtures of homopolymers or of copolymers such as defined above.

These compositions may be either rigid or flexible. When rigid compositions are employed, they may then contain impact strength modifiers, pigments and/or fillers, lubricants which aid in their processing, in addition to the polymer and to the various stabilizers or adjuvants.

When "flexible" compositions are employed, these may contain primary or secondary plasticizers, pigments and/or fillers, lubricants, and the like, in addition to the polymer and to the various stabilizers or adjuvants. These stabilizers are essentially antioxidants, "light" or anti-UV stabilizers, as well as other compounds known for their effect on heat stabilization such as, for example, epoxides, phosphites and phenolic compounds.

These epoxides are generally complex compounds, usually epoxidized polyglycerides such as epoxidized soya oil, epoxidized linseed or fish oils, epoxidized tall oil, or epoxidized fatty acid esters, or epoxidized hydrocarbons such as epoxidized polybutadiene, or epoxidized ethers.

Various alkyl or aryl phosphites are also known for their stabilizing activity, such as, for example, phenyl 2-ethylhexyl phosphite, triisodecyl phosphite or diisooctyl pentaerythryl diphosphite.

Phenolic compounds are also employed as heat stabilizers: these are principally butylated hydroxytoluene (BHT) and other substituted phenols.

It is also within the ambit of the invention to add to the claimed stabilizers small quantities of additional stabilizers which are now well known to the art, such as, for example, beta-diketones, organic beta-aminocrotonic compounds or alpha-phenylindole derivatives or derivatives of substituted dihydropyridines or of other sulfur compounds such as the diesters of thiomalic acid.

The polysiloxanes of formula (1) may be introduced into the polymer either totally or partially, into the monomer or into the comonomers at any stage of the polymerization.

The three stabilizers employed in the process according to the invention may be incorporated at the same time as the other adjuvants. They may also be mixed with each other or with certain of the adjuvants. The stabilizing composition will then be subsequently incorporated in the polymer in powder form. Any of the usual methods which are known in this art may be suitable for producing the mixture of the ingredients.

The homogenization may, for example, be carried out at ambient temperature in a slow blender or may be carried out in a fast blender while the mixture is heated to a temperature between ambient temperature and 120° C. In general, in this latter embodiment, the solid adjuvants and the powdered polymer are introduced into the fast blender at ambient temperature, while the liquid adjuvants are added at a temperature from 40° to 60° C.

The mixing is continued until the homogenization is complete. Periods from 3 to 20 minutes are generally sufficient, but these times are provided merely by way of illustration.

The stabilized compositions based on polyvinyl chloride according to the invention may be processed according to any of the techniques usually employed for converting PVC and PVC copolymer compositions, for example: injection molding, extrusion, blow extrusion, calendering, and rotational molding.

The stabilization process according to the invention makes it possible to considerably delay, or even to suppress, the appearance of yellowing during the period when the processed polyvinyl chloride-based composition is heated to 180° C. and above, and to obtain transparent, colorless and homogeneous finished products which exhibit no exudation.

In addition to their particularly effective stabilizing action, the polysiloxanes of formula (1) impart to vinyl chloride-based polymers such surface properties as external lubrication, processing-aid action, nonadhesion, demolding, water-repellence, surface appearance, nonadhesion of dust, abrasion resistance, anti-fogging and haemocompatibility, and are remarkably compatible with PVC.

In order to further illustrate the present invention and the advantages thereof, the following specific examples are given, it being understood that same are intended only as illustrative and in nowise limitative.

EXAMPLE 1

Into a 6-liter three-necked round bottomed flask equipped with central stirring, a dropping funnel, a reflux condenser and a thermometer sheath, and heated by means of a controlled temperature bath, were charged:
(i) 2,000 g of a gamma-hydroxypropylated oil of the formula (3) above, in which $R=CH_3$, $Y=-(CH_2)_3-$, $p+q$ was approximately 9 and $r$ was approximately 8.5, titrating for 485 meq/100 g of alcohol functional groups, which represents 9.7 OH equivalents;
(ii) 1,117 g of alpha-mercaptoacetic acid of formula (2) with $R'=H$, freshly distilled, representing 12.14 acid equivalents, i.e., an approximately 25% molar excess relative to the alcohol functional groups;
(iii) 2,000 ml of toluene; and
(iv) 15.6 g of p-toluenesulfonic acid.

The mixture was refluxed for three hours, 180 ml of water formed by the esterification reaction were distilled off azeotropically, and the reaction was terminated by neutralizing the excess alpha-mercaptoacetic acid with a concentrated aqueous solution containing 440 g of sodium acetate in 800 ml of water.

The reaction mixture was then maintained stirred for 30 minutes, the aqueous layer was allowed to settle and was removed by gravity separation and toluene was removed from the organic phase by distillation at atmospheric pressure and then at a reduced pressure of 1.6 kPa. A slightly cloudy and colored oil was obtained in this manner, and was treated for 90 minutes over 40 g of carbon black and was filtered under nitrogen through a Teflon ® filter with a mean pore diameter of 0.45 micrometer. 2,693 g of a clear and colorless oil were obtained in this manner.

The analyses carried out on this oil evidenced the absence of carboxylic acid groups (—COOH) by acidimetry. The IR and NMR spectra showed a structure of the oil which agreed with the expected structure.

The mercaptan functional group was determined as a weak acidic functional group by acidimetry in a hydroalcoholic medium. The SH functional group titer obtained was 330 meq/100 g. 8.9 g equivalents of SH functional groups were thus obtained in the case of the 9.7 equivalents of gamma-hydroxyalkyl functional groups employed, which gave a yield of 91.6%. The average formula of the oil produced was approximately:

EXAMPLE 2

The procedure was as in Example 1, except that a deficiency of alpha-mercaptoacetic acid was used in the reaction.

Into the 6-liter three-necked round flask were charged:
(i) 2,000 g of the gamma-hydroxypropylated oil containing 485 meq/100 g;
(ii) 580 g (6.3 moles) of alpha-mercaptoacetic acid;
(iii) 2,000 ml of toluene; and
(iv) 5 g of p-toluenesulfonic acid.

The reaction mixture was refluxed for 90 minutes, 115 ml of water formed were distilled off azeotropically (theoretical quantity of water, 113.4 ml) and the reaction was then terminated.

After purification of the oil produced according to the operating procedure of Example 1, 2,446 g of oil which acidimetry showed to contain 236 meq/100 g of SH functional groups were obtained.

The various analyses and the NMR and IR spectra corresponded to the expected average formula for the oil produced:

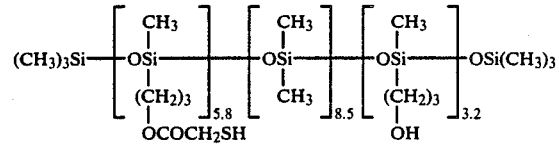

and to 123 meq/100 g of SH, determined by acidimetric titration.

EXAMPLE 3

The procedure was that of Example 1 and the following were charged into the three-necked round flask:
(i) 200 g of the gamma-hydroxypropylated oil titrating for 352 meq/100 g of alcohol functional groups, of average formula:

(ii) 32.4 g of alpha-mercaptoacetic acid representing 352 meq of acid functional group;
(iii) 300 ml of toluene; and
(iv) 1 g of p-toluenesulfonic acid.

The reaction mixture was refluxed for one hour while 5.1 ml of water formed were distilled off azeotropically (theory: 6.34 ml).

After purification, 212 g of clear and colorless oil were obtained, the chemical and spectral analyses of which were in agreement with the oil of average formula:

and titrating for 123 meq/100 g of SH, determined by acidimetry.

EXAMPLE 4

The procedure was as in Example 1 and the following were charged into the three-necked round flask:
(i) 500 g of the gamma-hydroxypropylated oil employed in Example 1;
(ii) 261 g of 2-alpha-mercaptopropionic acid (98.5% purity) of formula HS—CH(CH$_3$)COOH, representing 2,452 meq of acid functional group;
(iii) 1,000 ml of toluene; and
(iv) 3 g of p-toluenesulfonic acid.

After the reaction mixture had been refluxed for 5 hours, 35 ml of water were collected (as against 43.7 ml theoretically) and the reaction was terminated. It was found, therefore, that the esterification reaction was slower than in Examples 1 to 3.

After purification, 666 g of a clear, colorless oil were obtained, the chemical and spectral (NMR, IR) analyses of which were in agreement with an oil of the average formula:

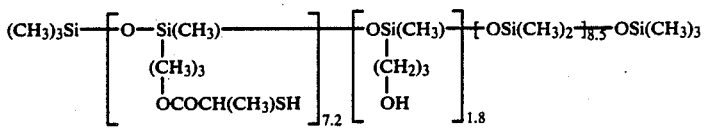

EXAMPLES 5 to 20 (plasticized PVC)

The following homogeneous base composition A was prepared:
(a) 2,000 g of powdered PVC, characterized by a viscosity value of 120 according to NF Standard T 51 013, obtained by emulsion polymerization and marketed under the trademark Solvic ® 271 GB;
(b) 1,000 g of dioctyl phthalate;
(c) 30 g of epoxidized soya oil;
(d) 10 g of barium p-tert-butylbenzoate;
(e) 2 g of zinc 2-ethylhexanoate; and
(f) 4 g of oxidized polyethylene wax marketed under the trademark Cime ® AC 629-A.

16 fractions, each of 152 g were taken (each fraction containing 100 g of PVC). A certain quantity of the oil obtained in Examples 1 to 4 was added to each fraction. By way of comparison, fraction 1 of Comparative Example 5 contained no additive and fractions 2, 3 and 4 of Comparative Examples 6, 7 and 8 contained instead of these oils, the 2-mercaptopropionic diester of neopentyl glycol, hereinafter designated ENPG, of the formula:

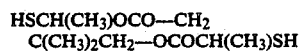

Using the various compositions obtained, as well as the unmodified composition A, sheets 1 mm in thickness were prepared by milling on a two roll mill for 3 minutes at 180° C. Rectangular specimens of approximately 1×2 cm were cut from these sheets.

The heat aging test was carried out on these specimens, in an oven at 180° C., for various periods of time (t in minutes).

The color of the specimens was then determined by comparison with a Lovibond disc according to the Gardner scale.

The results are reported in Table I below, in which:
Q: added quantity of stabilizer in g per 100 g of PVC
t: time in minutes
X: time in minutes at the end of which a black color is obtained
*: black edges on the specimens.

From Table I below it appears that the oils according to the invention have a PVC-stabilizing capacity at least equivalent to that of ENPG.

TABLE I

| | | | GARDNER COLOR AS A FUNCTION OF TIME AT 180° C. | | | | | | | |
|---|---|---|---|---|---|---|---|---|---|---|
| | | | | | | t | | | | |
| Example | STABILIZER | Q | 0 | 7 | 14 | 21 | 30 | 45 | 60 | X |
| 5 | Control A | 0 | 0 | 1 | 2 | 3 | 3 | 3 | * | 65 |
| 6 | ENPG | 0.4 | 0 | 0 | 0 | 0 | 0 | 0.5 | 1 | 70 |
| 7 | ENPG | 0.6 | 0 | 0 | 0 | 0 | 0 | 0 | 0.5 | 75 |
| 8 | ENPG | 0.8 | 0 | 0 | 0 | 0 | 0 | 0 | 0 | 85 |
| 9 | Oil of Example 1 | 0.4 | 0 | 0 | 0 | 0 | 0 | 0.5 | 1 | 90 |
| 10 | Oil of Example 1 | 0.6 | 0 | 0 | 0 | 0 | 0 | 0 | 0 | 110 |
| 11 | Oil of Example 1 | 0.8 | 0 | 0 | 0 | 0 | 0 | 0 | 0 | 120 |
| 12 | Oil of Example 2 | 0.4 | 0 | 0 | 0 | 0 | 0.5 | 1 | 2 | 80 |
| 13 | Oil of Example 2 | 0.6 | 0 | 0 | 0 | 0 | 0 | 0.5 | 1 | 95 |
| 14 | Oil of Example 2 | 0.8 | 0 | 0 | 0 | 0 | 0 | 0 | 1 | 110 |
| 15 | Oil of Example 3 | 0.4 | 0 | 0 | 0 | 0 | 1 | 2 | 3 | 65 |
| 16 | Oil of Example 3 | 0.6 | 0 | 0 | 0 | 0 | 0 | 1 | 2.5 | 80 |
| 17 | Oil of Example 3 | 0.8 | 0 | 0 | 0 | 0 | 0 | 0 | 2 | 85 |

TABLE I-continued

| | | | GARDNER COLOR AS A FUNCTION OF TIME AT 180° C. | | | | | | | |
|---|---|---|---|---|---|---|---|---|---|---|
| | | | | t | | | | | | |
| Example | STABILIZER | Q | 0 | 7 | 14 | 21 | 30 | 45 | 60 | X |
| 18 | Oil of Example 4 | 0.4 | 0 | 0 | 0 | 0 | 0 | 0.5 | 2 | 95 |
| 19 | Oil of Example 4 | 0.6 | 0 | 0 | 0 | 0 | 0 | 0.5 | 2 | 90 |
| 20 | Oil of Example 4 | 0.8 | 0 | 0 | 0 | 0 | 0 | 0 | 1.5 | 110 |

EXAMPLES 21 to 25 (rigid PVC)

The following homogeneous basic composition B was prepared:
(a) 1,000 g of powdered PVC, characterized by a visketed under the trademark Lacqvyl$^R$SO 71 S;
(b) 80 g of impact strengthening agent (butadienestyrene-methyl methacrylate copolymer);
(c) 20 g of oxidized polyethylene wax;
(d) 40 g of epoxidized soya oil;
(e) 2.5 g of calcium stearate; and
(f) 2.5 g of zinc stearate.

5 fractions, each of 114.5 g, were prepared (each fraction containing 100 g of PVC). The first fraction contained no additive (Comparative Example 21), fractions 2 and 3 contained ENPG as additive (Comparative Examples 22 and 23). Fractions 4 and 5 contained the oil of Example 1.

The procedure followed was the same as in Examples 5 and 20. The results obtained are reported in Table 2 below in which the abbreviations employed are the same as in Table I. From Table II it appears that the oils according to the invention have a very marked PVC-stabilizing capacity, at least equivalent to that contributed by ENPG.

TABLE II

| | | | GARDNER COLOR AS A FUNCTION OF TIME AT 180° C. | | | | | | | |
|---|---|---|---|---|---|---|---|---|---|---|
| | | | | t | | | | | | |
| Example | STABILIZER | Q | 0 | 7 | 14 | 21 | 30 | 45 | 60 | X |
| 21 | Control B | 0 | 3 | 6 | 7 | 8 | 8 | 10 | 11 | 65 |
| 22 | ENPG | 0.4 | 0 | 0 | 4 | 7 | 10 | 10 | 10 | 70 |
| 23 | ENPG | 0.8 | 0 | 0 | 0.5 | 3 | 6 | 7 | 10 | 70 |
| 24 | Oil of Example 1 | 0.4 | 0 | 0 | 4 | 6 | 10 | 10 | 10 | 70 |
| 25 | Oil of Example 1 | 0.8 | 0 | 0 | 0 | 3 | 5 | 7 | 10 | 75 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane having the general formula (1):

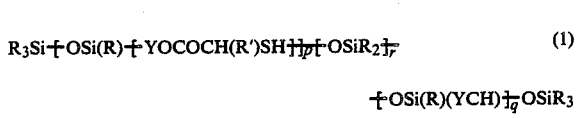

in which:
the symbols R, which are identical or different, are each $C_1$-$C_8$ linear or branched chain alkyl, phenyl or 3,3,3-trifluoropropyl radicals, at least 80% of the radicals R being methyl radicals;
the symbols Y, which are identical or different, are each $C_1$-$C_{18}$ linear or branched chain alkylene radicals,
R' is a hydrogen atom or a $C_1$-$C_8$ linear or branched chain alkyl radical;
p is an integer ranging from 1 to 50;
q is an integer ranging from 0 to 30; and
r is an integer ranging from 0 to 500.

2. The diorganopolysiloxane as defined by claim 1, wherein R is methyl, R is H or methyl and Y is—$(CH_2)_3$—.

3. A process for preparing the diorganopolysiloxane as defined by claim 1, comprising reacting an alpha-mercaptoacid of the formula:

$$HOOCCH(R')SH \qquad (2)$$

with a diorganopolysiloxane of the formula:

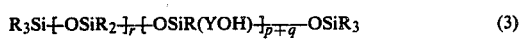

and removing water of condensation from the medium of reaction.

4. The process as defined by claim 3, wherein the reaction is carried out in the presence of an acidic catalyst.

5. The process as defined by claim 4, said catalyst comprising p-toluenesulfonic acid.

6. The diorganopolysiloxane as defined by claim 1 wherein the $C_1$-$C_{18}$ linear or branched chain alkylene radical is extended by poly(ethylene oxide), poly(propylene oxide) or mixture thereof.

7. The diorganopolysiloxane as defined by claim 6 wherein R is methyl, R is H or methyl and Y is—$(CH_2)_3$—.

8. A process for preparing the diorganopolysiloxane as defined by claim 6, comprising reacting an alpha-mercaptoacid of the formula:

$$HOOCCH(R')SH \qquad (2)$$

with a diorganopolysiloxane of the formula:

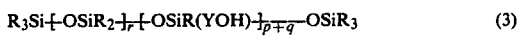

and removing water of condensation from the medium of reaction.

9. The process as defined by claim 8, wherein the reaction is carried out in the presence of an acidic catalyst.

10. The process as defined by claim 9, said catalyst comprising p-toluenesulfonic acid.

* * * * *